(12) United States Patent
Niesner et al.

(10) Patent No.: US 11,773,032 B2
(45) Date of Patent: Oct. 3, 2023

(54) BIOSTIMULANT COMPOSITION

(71) Applicant: PN S.A., Mondorf-les-Bains (LU)

(72) Inventors: Pierre Niesner, Mondorf-les-Bains (LU); Jean-Martin Niesner, Creuzwald (FR)

(73) Assignee: PN S.A., Luxembourg (LU)

( * ) Notice: Subject to any disclaimer, the term of this patent is extended or adjusted under 35 U.S.C. 154(b) by 230 days.

(21) Appl. No.: 17/368,473

(22) Filed: Jul. 6, 2021

(65) Prior Publication Data

US 2022/0009851 A1 Jan. 13, 2022

(30) Foreign Application Priority Data

Jul. 7, 2020 (EP) .................................... 20184531

(51) Int. Cl.
| | |
|---|---|
| *C05F 11/00* | (2006.01) |
| *C05G 5/12* | (2020.01) |
| *C05G 5/27* | (2020.01) |
| *A01C 21/00* | (2006.01) |
| *C05D 9/02* | (2006.01) |
| *C05G 1/00* | (2006.01) |

(52) U.S. Cl.
CPC .............. *C05F 11/00* (2013.01); *A01C 21/00* (2013.01); *C05D 9/02* (2013.01); *C05G 1/00* (2013.01); *C05G 5/12* (2020.02); *C05G 5/27* (2020.02)

(58) Field of Classification Search
None
See application file for complete search history.

(56) References Cited

U.S. PATENT DOCUMENTS

2019/0014788 A1* 1/2019 Sawant .................. A01N 65/20

FOREIGN PATENT DOCUMENTS

| EP | 2246318 A1 * | 11/2010 | ............... C05D 9/02 |
| JP | 3573827 B * | 1/1997 | ............. C09K 17/08 |
| WO | WO 2019/021250 A1 * | 1/2019 | ............. A61K 36/02 |

* cited by examiner

*Primary Examiner* — Wayne A Langel
(74) *Attorney, Agent, or Firm* — McLane Middleton, Professional Association

(57) ABSTRACT

Biostimulant composition. The invention relates to a biostimulant composition for plants, comprising (i) micronized zeolite and (ii) micronized calcareous algae, for instance lithothamnion. The mass ratio between the zeolite content and the content of calcareous algae is between 0.1 and 10, preferably between 0.25 and 4. The particle size of the zeolite or, respectively, of the calcareous algae is such that the diameter D90 is less than 20 μm, preferably less than 10 μm, or even less than 4 μm, when it is measured by laser particle size analysis in accordance with the standard ISO 13320:2020 on the basis of the Fraunhofer scattering model. The zeolite and the calcareous algae together represent at least 60% by mass, preferably at least 75% by mass and even more preferably at least 90% by mass, of the solid matter of the composition.

18 Claims, 1 Drawing Sheet

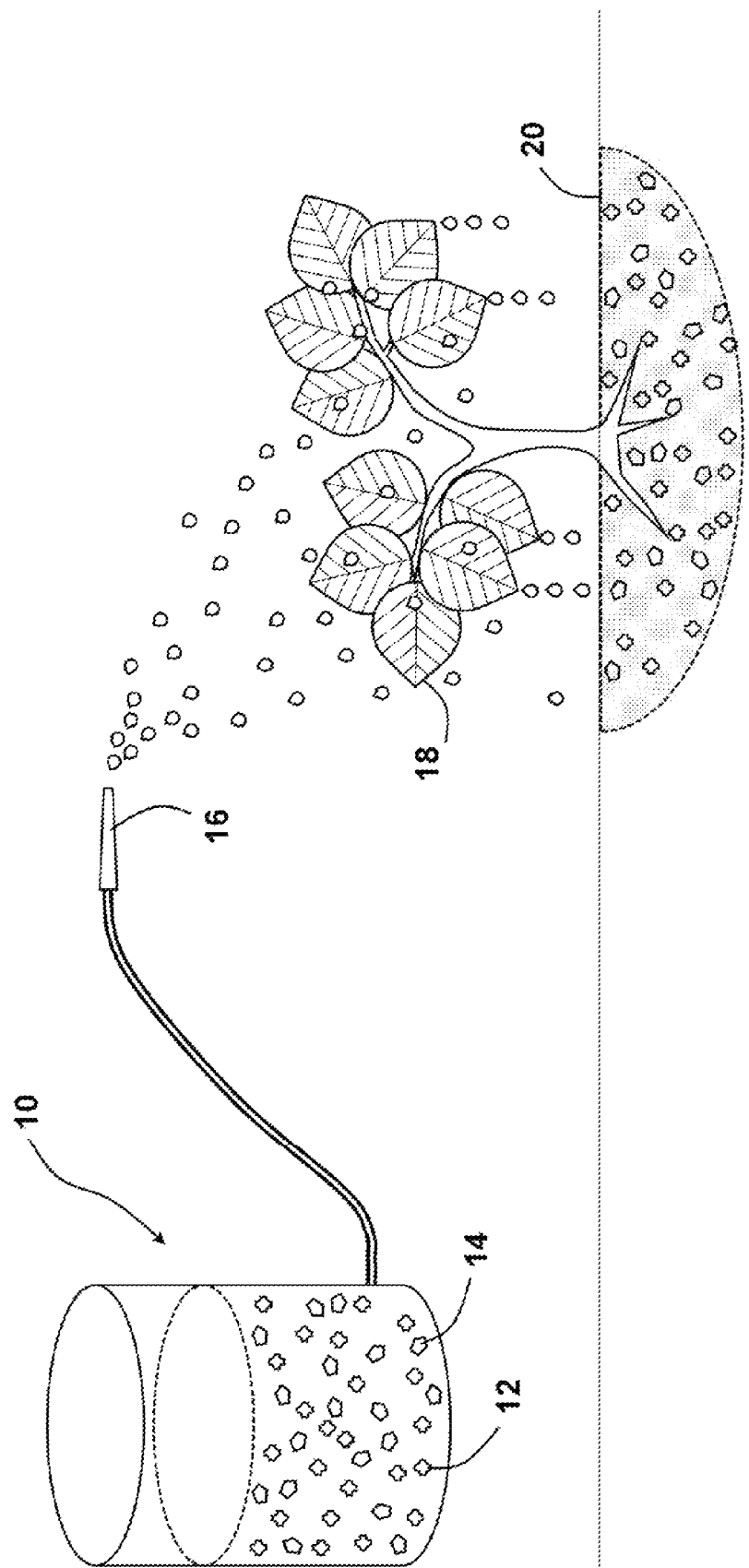

BIOSTIMULANT COMPOSITION

TECHNICAL FIELD

The invention relates in general to a biostimulant composition, in particular a mineral composition, mainly for foliar application. More precisely, the invention relates to a biostimulant composition comprising (i) micronized zeolite and (ii) micronized calcareous algae.

TECHNICAL BACKGROUND

The sector of biostimulants in the agricultural field has been in full expansion in recent years. This growth is linked to the constant environmental and public pressure to which farmers are subjected regarding the use of synthetic products, but also the awareness of the essential role of the relationships between soil microorganisms and plants: this is what is known as sustainable agriculture.

In this context, the expression "biostimulant composition" is used to denote a composition comprising at least one substance (notably zeolite) which may be termed a "biostimulant" or a "plant biostimulant" within the meaning of (EU) Rule 2019/1009, i.e. denoting a substance which stimulates the nutrition processes of plants independently of the nutritive elements it contains, for the sole purpose of improving the efficiency of use of the nutritive elements, the tolerance to abiotic stress, the qualitative characteristics and/or the availability of the nutritive elements confined in the soil or the rhizosphere. It will be noted, however, that concrete embodiments of the composition according to the invention may be marketed under other names, for instance "fertilizer", "fertilizer comprising biostimulants", "fertilizing material", "fertilizer combination", etc. The choice of the name will notably depend on the legislation and standards to be followed in the country of marketing and also the specific composition of the product.

The inventors set themselves the objective of developing a natural product that can be used in both organic and conventional farming. This product, which should be harmless to the user, also needed to be easy to use, to be applied with conventional equipment and to be able to be used by the largest possible number of farmers. Another aspect targeted was to propose a product that is compatible with conventional products used in plant defence, which can be used in combination (as a supplement) to said products or as a (total or partial) replacement product.

EP 2 246 318 A1 describes a material with a porous structure, comprising silicate, and a compound selected from alkali metal or alkaline-earth metal carbonates, hydroxides or oxides, and also mixtures thereof. It is mentioned that the material can serve as a soil fertilizer.

US 2019/0014788 A1 discloses a composition for plant nutrition, reinvigoration and protection, comprising algae and an agrochemically acceptable excipient in the form of an aqueous suspension. WO 2019/021250 A1 describes a granular composition based on algae for the same uses. The composition also comprises an agrochemically acceptable excipient.

GENERAL DESCRIPTION OF THE INVENTION

A first aspect of the invention relates to a biostimulant composition for plants, comprising micronized zeolite and micronized calcareous algae (which are preferably dead), for instance lithothamnion. The mass ratio between the zeolite content and the content of calcareous algae is between 0.1 and 10, preferably between 0.25 and 4. The particle size of the zeolite or, respectively, of the calcareous algae is such that the diameter D90 is less than 20 µm, when it is measured by laser particle size analysis in accordance with the standard ISO 13320:2020 on the basis of the Fraunhofer scattering model. The zeolite and the calcareous algae together represent at least 60% by mass, preferably at least 75% by mass and even more preferably at least 90% by mass of the solid matter (of the dry matter with a residual weight content of water of less than 3%, obtained after evaporation of any water contained) of the composition. Preferably, any solid component other than the zeolite and a calcareous alga is present in the composition with an individual mass content not exceeding 50% of the value that is the smaller between the mass content of calcareous algae and the mass content of zeolite. Preferably, the mass proportion in the composition of any solid component other than the zeolite and a calcareous alga does not exceed 5%.

In the particularly preferred case, the mass ratio between the zeolite content and the content of calcareous algae is between 0.25 and 4, the zeolite and the calcareous algae together represent at least 90% by mass of the solid matter of the composition and the individual mass content of any other solid component does not exceed 50% of the value that is the smaller between the mass content of calcareous algae and the mass content of zeolite.

The invention combines the zeolite and the calcareous algae in micronized form in a single product. It should be noted that the zeolite is present in the composition as a main active component in the same respect as the calcareous algae. In other words, the zeolite cannot be considered as an excipient, but contributes actively towards the efficacy of the composition. The combination of the zeolite and of the calcareous algae leads effectively to a synergistic effect in the biostimulant composition.

In foliar application, the composition encourages the metabolism of plants and, as a result, facilitates the absorption and assimilation of nutritive elements and water. The use of the composition thus makes it possible to reduce the amount of fertilizers applied to the soil or to the plants while at the same time avoiding a loss of yield of the crop, and also reducing the water needs. It has also been shown that the biostimulant composition makes it possible to obtain better yields than on control crops.

When applied to organic or conventional farming, the biostimulant composition makes it possible to improve the yield of the crops, to limit the risk of development of diseases and to improve the intrinsic and visual qualities of the products harvested.

When applied to the soil, the composition limits the leaching of nitrogen by means of reversible retention. This leaching is often the cause of nitrogen starvation on organic crops.

Preferably, the biostimulant composition is conditioned in the form of a wettable powder, in the form of a suspension concentrate or in the form of water-dispersible granules. For use, the composition is mixed with water, so as to form a suspension which can be sprayed onto the crops.

Unless expressly mentioned otherwise in the present text, all the particle size measurements refer to measurements that are obtained by laser particle size analysis in accordance with the standard ISO 13320:2020 on the basis of the Fraunhofer scattering model (diameters corresponding to the equivalent spherical volumes). The particle size of the main ingredients (zeolite and calcareous algae) is chosen such that a significant fraction can penetrate the epidermis of the leaves by passing via the opening of the stomata, known as the ostiole. Although it could be observed that particle sizes having a diameter D90 of less than 20 µm have a beneficial effect on the plants treated, compositions with an even higher proportion of very fine particles are preferred. Thus, the diameter D90 of the zeolite is preferably less than 15 µm, more preferably less than 10 µm and even more preferably less than 4 µm. Preferably, the diameter D50 of the zeolite is less than 10 µm, more preferably less than 5 µm or even less than 3 µm or even less than 1 µm. The diameter D90 of the calcareous algae is preferably less than 15 µm, more preferably less than 10 µm and even more preferably less than 4 µm. Preferably, the diameter D50 of the calcareous algae is less than 8 µm, more preferably less than 5 µm or even less than 3 µm or even less than 1 µm. Particularly preferably, both the diameter D90 of the zeolite and that of the calcareous algae is less than 15 µm, preferably less than 10 µm. Particularly preferably also, both the diameter D50 of the zeolite and that of the calcareous algae is less than 10 µm, preferably less than 5 µm. In general, whether the composition is in liquid or solid form, the finer the particle size, the better the effect on the plants. Also, the finer the composition, the larger will be the proportion of the mixture that is soluble in the acids of the plants. Particularly preferably, the particle size of the two main ingredients (algae and zeolite) is identical, the diameters D90 and D50 being chosen as indicated above. An identical (common) particle size may be obtained by combined micronization of the ingredients in a mill after mixing in coarser form. A biostimulant composition according to the invention in which the particle size of the algae and of the zeolite is identical (for example after combined micronization), with a diameter D90 of less than 4 microns and a diameter D50 of less than 1 micron, is currently preferred.

The calcareous algae may comprise lithothamnion (maerl). According to an advantageous embodiments of the biostimulant composition, lithothamnion represents at least 50% by mass, preferably at least 75% by mass, of the calcareous algae. As lithothamnion is an alga that is particularly soft and rich, it may represent 100% of the calcareous algae.

It will be appreciated that calcareous algae have a naturally high content of calcium carbonate and also of magnesium carbonate. These substances are in a form that is readily assimilable by plants. Calcareous algae also contain other minerals and trace elements such as manganese, zinc, molybdenum, boron, iron, copper, etc.

Preferably, the biostimulant composition comprises between 0.1% and 20%, advantageously between 2% and 4%, by mass of bioassimilable trace elements selected from manganese, zinc, molybdenum, boron, iron, copper and sulfur, and also bioassimilable oxides and salts thereof. Marine calcareous algae may naturally contain from 0.1% to 2% by mass of trace elements. To arrive at a higher content of bioassimilable trace elements, they are added to the mixture of zeolite and calcareous algae. Added trace elements are not essential for the biostimulant effect of the composition, but will serve to cover any deficiency.

Besides calcareous algae, the biostimulant composition may comprise other types of marine biogenic calcareous concretions, which are preferably not rocky, and/or shell debris.

Zeolites are crystalline aluminosilicates of general empirical formula: $(M_{2/n}O)\cdot Al_2O_3\cdot ySiO_2\cdot zH_2O$ where M represents an element from group IA or IIA (alkali metals or alkaline-earth metals), n is the valency of M, y is between 2 and 10 and z is the number of water molecules (see, for example, "Introduction to Zeolite Science and Practice", E. M. Flanigen, J. C. Jansen, Herman van Bekkum, Elsevier, 1991, ISBN 0-444-88969-8). Preferably, the zeolite contained in the composition mainly comprises chabazite or clinoptilolite, but other types such as erionite, mordenite or phillipsite are also possible. The zeolite may be natural or synthetic, natural zeolite being preferred. Zeolites are naturally charged with minerals which may be different depending on the type of zeolite. Clinoptilolite is naturally charged with Ca and K, chabazite is naturally charged with Ca, K, Fe and Mg; this is the one that is the more advantageous in agriculture.

According to certain advantageous embodiments of the invention, the zeolite of the biostimulant composition comprises at least 50% by mass, preferably at least 75% by mass, of chabazite and/or clinoptilolite.

It will be appreciated that the biostimulant composition may contain, for certain applications, surface-active agents, surfactants, antifreeze, wetting agents-dispersants, thickeners, biocides, antifoam, water, or any other additive which facilitates the preparation of a sprayable suspension, and also the use, application, storage, etc. of the biostimulant composition in all its forms.

Another aspect of the invention relates to an aqueous suspension comprising between 0.5% and 5% by mass, preferably between 0.5% and 2% by mass, relative to the solid matter, of biostimulant composition. Such a suspension would be ready to use by spraying.

Another aspect of the invention relates to a method for using the biostimulant composition, as described in the present document, in agriculture. Such a method preferably comprises the foliar application of the biostimulant composition onto plants. However, application to the soil is not excluded.

Preferably, the dosage of the biostimulant composition is such that it supplies, per hectare and per application, between 1 and 5 kg, preferably between 1.5 and 4 kg, of solid matter of the biostimulant composition.

Finally, one aspect of the invention relates to a process for preparing the biostimulant composition which will allow its efficacy to be optimized. In the present case, for optimum efficacy, the calcareous algae and the zeolite are intimately mixed, taking care to ensure the homogeneity of the components, in a mixer (for example a blade mixer). At this stage of the process, the algae and the zeolite are even coarser (for example sizes of between 100 and 400 microns, or even more).

Once a homogeneous mixture has been obtained, it is micronized to the desired size. The micronization may be performed via the dry route with a machine such as a jet mill or the like, or via the wet route. The choice of the micronizer may be made as a function of the type of final composition: wettable powder or suspension (as concentrate). Combined (and simultaneous) premixing and micronization of the two main components has the effect of affording better assimilation by plants, and increased efficacy on the plant may thus be obtained.

BRIEF DESCRIPTION OF THE DRAWINGS

Other particular features and characteristics of the invention will emerge from the detailed description of certain advantageous embodiments presented below, for illustrative purposes, with reference to the attached drawing which shows:

FIG. 1: A schematic illustration of the biostimulant composition suspended in water and application thereof to plants.

DETAILED DESCRIPTION OF THE INVENTION

The appeal of marine minerals rich in calcium carbonate for agriculture arises from their soft structure containing trace elements. Among these, calcareous algae, for instance lithothamnion, head the classification with a particularly high carbonic solubility. Lithothamnion is particularly rich in calcium (in the form of calcium carbonate) and in magnesium (in the form of magnesium carbonate) and contains numerous trace elements, some of which are rather rare. The present invention makes it possible to further upgrade marine minerals, by enhancing their assimilation and their efficacy on plants, notably by means of zeolite.

For plants, calcium is fundamental during the growth of the cell tissues, notably in the cell wall. Moreover, the roots are the first victims of a calcium deficiency. Specifically, in such a case, the main roots do not grow correctly, the exploitation of the soil is thereby penalized and the NPK (nitrogen, phosphorus, potassium) nutrition is decreased.

Magnesium, for its part, which is required in smaller amount, is a vital constituent of chlorophyll and plays a major role in the correct functioning of photosynthesis. Less well known is the fact that it also aids the correct circulation of phosphorus, which is fundamental for energy transmission, via enzyme activations.

The trace elements, although absorbed in small amounts by the crop (from a few tens to a few hundred grams per hectare), are essential for both the growth and health of the plants.

A product of natural basis, combining a maximum of these characteristics (calcium, magnesium and trace elements), which may subsequently be enriched with specific minerals or trace elements to adapt more precisely to different crops is thus proposed.

Lithothamnion (*Phymatolithon calcareum*) is an alga of the Hapalidiaceae family and of the Melobesioideae subfamily, which produces calcareous concretions. It is obtained from marine media, which are preferably dead, and composed essentially of calcium and magnesium in the form of carbonates. It is reputed for its ease of concentrating trace elements from seawater, and is poor in heavy metals. Its particularly high carbonic solubility (80% at 65 microns) reflects the fact that this soft enrichment is fast-acting. The speed of action increases the more finely the lithothamnion is milled. The term "carbonic solubility" means the percentage of carbonates dissolved within two hours from a sample of the test material in a water saturated with carbonic acid. The content of dissolved carbonates is measured by titration.

Lithothamnion milled to less than 20 μm, preferably with a large proportion below 15 μm, or even 10 μm, in particular in combination with micronized zeolite, is an efficient biostimulant for foliar application, since the tenderness, fineness and composition of the product allows particularly rapid action of the assimilated calcium, magnesium and trace elements by the plant, the assimilation being promoted by the zeolite.

A zeolite is an aluminosilicate of nanoporous structure. The empty spaces are connected together and are initially occupied by cations and water molecules. The cations and the water molecules are mobile within the structure, which allows ion exchanges, on the one hand, and reversible partial dehydration, on the other hand.

Numerous zeolites listed in several families exist, but clinoptilolite (lamellar-monoclinic zeolite) and chabazite (hexagonal-cubic zeolite) are the ones that are the most efficient in agriculture on account of their composition of exchangeable cations (Ca, K and Na) and their cation-exchange capacities.

Synthetic zeolites also exist, but natural zeolites are favoured in the context of the invention, notably those originating from deposits selected for their purity.

When micronized to a fine particle size (D90<20 μm, preferably <15 μm, even more preferably <10 μm and even more preferably <4 μm) and in foliar application, by virtue of its nanoporous structure and its cation-exchange capacity, zeolite has very beneficial effects on plants and the soil, notably:

reduction of water stress and, thereby, of abiotic stress,
protection against heat stress by protecting the leaf surface against radiation,
uptake of $CO_2$, which increases photosynthesis at the expense of photorespiration,
promoting the retention and exchange of various cations and releasing them as a function of the needs of the plant,
improving the cationic exchange capacity (CEC) of the soil over the years by means of the portion of the zeolite which trickles to the soil and acts as a water retainer close to the roots without any variation in volume, without causing any phytotoxicity, and while maintaining aeration favourable to the growth of microorganisms.

The invention combines the zeolite and the calcareous algae in micronized form in a composition. As presented above, these two basic products each have highly advantageous intrinsic properties. During testing of the products individually and as a mixture, synergism between the micronized calcareous algae and the micronized zeolite was able to be observed.

Certain aspects of plant metabolism should be recalled. Water charged with mineral salts is absorbed by the rootlets and must reach the xylem vessels via various pathways to nourish the plant. Transpiration plays an important role in the absorption of water from the soil: it is the motor for the circulation of raw sap. Specifically, the more the plant transpires, the more efficient will be the suction, and the plant will thus absorb more nutritive solution from the soil. Cuticle transpiration represents only 5% to 10% of the total transpiration. The transpiration takes place predominantly at the stomata: this is then referred to as stomatal transpiration. This varies according to the opening and closure of the stomata, directly associated with the osmotic pressure differences in the guard cells of which they are constituted. Specifically, the stomata open and close as a function of the osmotic forces which correspond to the variations in the intracellular potassium concentration. It is also via the stomata that the absorption of the $CO_2$ required for photosynthesis takes place. An increase in the potassium concentration will bring about turgescence of the guard cells and opening of the stomata, and thus facilitate the nutritive and photosynthetic mechanisms.

The micronized ingredients of the biostimulant composition have a fineness such that, when applied to the leaves of crops, they (partly) penetrate the epidermis of the leaves by passing via the opening of the stomata, known as the ostiole.

The zeolite, by virtue of its nanoporous structure, its negative charge and its composition, facilitates the opening of the stomata and enables reversible exchanges of the nutritive cations, of the water molecules and of $CO_2$ in the mesophyll. This results in better assimilation of the nutritive elements, in particular of the minerals and trace elements contained in the calcareous algae, and improvement of the metabolism and photosynthetic processes of the plant. The zeolite induces better upgrading of the calcareous algae.

Under the effect of light, the activity of the membrane ATPases responsible for the entry of $K^+$ ions is stimulated. The $K^+$ contained in the zeolite accumulates in the vacuoles, facilitating the entry of water into the guard cells and opening of the stomata. Opening of the stomata in turn enables better absorption of the mineral elements and trace elements, which are particularly soft and readily assimilable, contained in the calcareous algae. Furthermore, assimilation of these cations in the mesophyll is encouraged by the storage and redistribution mechanisms induced by the zeolite particles, due to their negative charge and their nanoporous structure.

Once assimilated, the nutrients contained in the calcareous algae will each have their specific role and effect on key sites such as the structure of the cells, the manufacture of proteins, the synthesis of chlorophyll or the activation of enzymes. The minerals and trace elements thus limit the risks of deficiency and ensure optimum growth of the plants.

The opening of the stomata, facilitated by the zeolite, promotes stomatal transpiration and thus improves the suction and absorption of water and minerals contained in the soil. The portion of the biostimulant composition which has trickled into the soil acts as an enrichment and ensures better mineralization of the soil.

The opening of the stomata facilitates the absorption of $CO_2$, which is stored in the mesophyll, and promotes photosynthesis.

The zeolite has the capacity of adsorbing the $CO_2$ present in the atmosphere to exchange it with water molecules at the surface of the plant. This increases the amount of $CO_2$ concentrated in the mesophyll, the site of photosynthesis, and thus promotes the photosynthetic yield. This mechanism increases the $CO_2$ fixing efficacy and improves the crop yield. It may induce shorter growing seasons. Since the stomatal transpiration stream is greater than the entering $CO_2$ stream, there is a risk of limitation of the $CO_2$ by the water molecules circulating in the opposite direction. This effect will be mitigated by the reversible exchanges permitted by the zeolite, which gradually takes up and distributes the transpiration water molecules.

The zeolite fixes to the cuticle and reduces the risk of foliar senescence due to prolonged dryness. This phenomenon also promotes photosynthesis and reduces the growth cycle. The protective film created on the surface of the leaves makes it possible to reduce the appearance of pathogenic fungi and spores. This effect results from the capacity of the zeolite to take up and retain water. An additional effect is the result of the shape of the zeolite crystals. For example, the pseudocubic and angular shape of the zeolite chabazite creates a rough and inhospitable surface on the plants, thus forming a protective barrier against phytophagous insects.

Gradually in the course of sprayings, the portion of the biostimulant composition which trickles into the soil will have considerable effects by virtue of the large contact surface area of the micronized ingredients, and in particular of the zeolite, the surface area of which may represent several hundred square metres per gram. This will be reflected by an improvement in the CEC (cationic exchange capacity) by virtue of the properties of the zeolites for fixing the exchangeable cations, the water-retaining effect generated in the vicinity of the roots without variation in volume or in phytotoxicity, and by maintaining aeration of the soil favourable to the growth of microorganisms which improve the qualities of compacted soils.

Thus, foliar application of the biostimulant composition at key stages, in concordance with the growth of the crops, is the most efficient application for acting rapidly and durably on plant metabolism. By virtue of the particle size of the basic products in the biostimulant composition, it is possible to make a significant portion of these minerals penetrate into the plants. The other portions which trickle down to enter the soil and those which remain attached to the surface of the leaves are not, however, devoid of interest:

For an action at the core of the plants, the calcareous algae supply calcium that is soft and readily assimilable, containing magnesium and other trace elements. The fact that the calcareous algae are micronized increases the carbonic solubility. The micronized zeolite which penetrates the stomata of the plants provides channels which facilitate and improve the assimilation, by the plant, of the minerals and trace elements contained in the calcareous algae. In addition, the zeolite acts as a buffer (due to its capacity to retain and release water and cations) for the minerals and trace elements supplied by the calcareous algae, which appears to improve their assimilation by the plant. Apart from this, the zeolite provides the anti-water stress and anti-abiotic stress effect.

A zeolite layer becomes deposited on the leaves, forming a film. This film provides a certain amount of UV protection, but also curbs the evapotranspiration.

A portion of the biostimulant composition trickles down to the soil. It will not, however, be lost. Due to the particle size, the fine particles have a large contact surface area. The calcareous algae contribute towards stabilizing the soil pH at the roots. The zeolite improves the CEC, the aeration in the vicinity of the roots, and does so in a long-lasting manner, since it is perennial in and not leachable into the soil.

These effects are reflected by a set of biological phenomena in the plants, on the plants and in the soil.

The zeolite and the calcareous algae applied simultaneously in micronized form improve the growth of the plants and the assimilation of the nutritive elements via the roots and the leaves. Tests show that an improvement in the crop yield and also in the quality and caliber of the products harvested may be achieved. Among the possible effects, mention may be made of:

improvement of the metabolism and of all of the natural growth processes of the plant;

better root development, and better capacity for absorption of nutrients from the soil, which makes it possible to better upgrade and thus to reduce the supply of fertilizers;

increased resistance of the plants to water stress, and real optimization of the water consumption with reduction of the irrigation needs;

increased resistance of the plants to biotic and abiotic stresses;

improvement of the qualities of the products, for example specific weight, oil content, seed size, caliber, Brix degree value, etc.

increase of the biomass (leaf, stem, root, etc.)

reduction of the crop growth cycles (the plants grow faster);

in conventional farming: reduction of the doses of plant-protection products.

The biostimulant composition of the invention is designed to be applied as a suspension in water by conventional spraying (for example using a sprayer equipped with slit nozzles). By application, use will preferably be made of 200 litres per hectare or more of suspension containing between 0.5% and 5% by mass of the biostimulant composition. The biostimulant composition will be mixed with water preferably by passing via the filling tank of the sprayer so as to avoid deposition at the bottom of the tank. Also, to prevent the solid particles from becoming deposited, stirring will preferably be maintained during the filling and the time of transportation to the fields.

The spraying will preferably take place at the end of the day, in calm weather and at the recommended doses and stages. These stages are specific to each type of crop: they take into account, inter alia, the technical constraints such as the limit treatment heights, but above all the key stages in the nutrition and growth of the plants, and also the periods of absorption of the nitrogenous fertilizers from the soil.

It will be noted that overdosing of the composition will not cause any harmful effect on the crops (for example burning), but may have the effect of becoming deposited at the bottom of the tank or of clogging the filters, nozzles, etc.

Numerous tests were performed, on various crops, in the laboratory under controlled conditions or in the field, with various formulations of the biostimulant composition in accordance with the invention. They made it possible to demonstrate the efficacy of the biostimulant composition in comparison notably with formulations containing only lithothamnion or only zeolite.

For each of the tests described hereinbelow, the doses applied were substantially the same, the stages varying as a function of the crops. The compositions according to the invention used in the context of the tests had a ratio of the zeolite content to the content of calcareous algae between 0.25 and 4, the zeolite and the calcareous algae together represented at least 90% by mass of the solid matter of the composition and the individual mass content of any other component (other than water) did not exceed 50% of the value that is the smaller between the mass content of calcareous algae and the mass content of zeolite.

Test 1—Vine in Fields on Test Plots
  Place: France, in the Champagne region
  Doses: four applications of 3 kg per hectare at precise stages
  Evaluated data: yield component/whole plant vigour score/weight of berries per plot/Brix degree value
  Six modes: control/micronized lithothamnion alone/micronized zeolite alone/three different biostimulant compositions according to the invention.
Test 2—Vine in the Laboratory
  Place: France, in the Alsace region
  Doses: three applications of 3 kg per hectare at precise stages
  Evaluated data: effect on the growth/effect on the fruiting/measurement of the biomass/measurement of the chlorophyll.
  Four modes: control/micronized lithothamnion alone/micronized zeolite alone/biostimulant composition according to the invention.
Test 3—Potatoes in Fields on Test Plots
  Place: France, in the Seine-et-Marne region
  Doses: four applications of 3 kg per hectare at precise stages
  Evaluated data: vigour score/weight per plot/calibration.
  Six modes: control/micronized lithothamnion alone/micronized zeolite alone/three different biostimulant compositions according to the invention.
Test 4—Wheat in Fields on Test Plots
  Place: Belgium (agricultural university of Wallonie)
  Doses: three applications of 3 kg per hectare at precise stages
  Evaluated data: yield component/impact on nitrogenous fertilization/impact on fungal disease
  Six modes: control/micronized lithothamnion alone/micronized zeolite alone/two different biostimulant compositions in accordance with the invention/two different biostimulant compositions in accordance with the invention, each associated with a nitrogenous fertilization modulation.
Test 5—Rape in the Laboratory
  Place: France, in the Alsace region
  Doses: three applications of 3 kg per hectare at precise stages
  Evaluated data: effects on the growth/biomass measurement/measurement of the relative amount of chlorophyll.
  Four modes: control/micronized lithothamnion alone/micronized zeolite alone/a biostimulant composition in accordance with the invention.
Test 6—Rape in Open Fields
  Place: France, in the Moselle region
  Doses: three applications of 3 kg per hectare at precise stages
  Evaluated data: seed yield and quality
  two modes: control/a biostimulant composition in accordance with the invention.
Test 7—Corn in Open Fields
  Place: France, in the Seine-et-Marne region
  Doses: two applications of 4 kg per hectare at precise stages
  Evaluated data: seed yield and quality
  Two modes: control/a biostimulant composition in accordance with the invention.
Test 8—Hemp in Open Fields
  Place: France, in the Seine-et-Marne region
  Doses: two applications of 4 kg per hectare at precise stages
  Evaluated data: seed yield and quality, straw yield
  Two modes: control/a biostimulant composition in accordance with the invention.
Ecotoxicity Tests
  Study of the impact on the water tables and microorganisms in the laboratory, on the components of the products taken separately and in the biostimulant compositions of the invention in order to prove its harmlessness on the soil and water tables.
Test Results
  The tests made it possible to demonstrate the following effects:
  A higher yield for the crops treated with a biostimulant composition according to the invention relative to the control of the order of 11% to 22%, as a function of the conditions and the crops.
  A higher yield for the crops treated with a biostimulant composition according to the invention relative to the plot treated with the pure micronized zeolite of the order of 1% to 13%.
  A higher yield for the crops treated with a biostimulant composition according to the invention relative to the plot treated with the pure micronized lithothamnion of the order of 2% to 12%.
  An improvement in the quality of the products harvested for the plots treated with a biostimulant composition according to the invention relative to the control:
    Weight of grape berries higher by about 10% to 20%
    Oil content higher for the rape seed by about 2 points
    Oil content higher for the hemp seed by about 2 points Weight of a thousand seeds (WTS) for wheat seeds higher by about 5 grams Lower water stress, particularly observed on the rape, wheat and corn seeds, since the conditions were arid, the grains had a better appearance and were better filled (this is confirmed with the increase in the WTS)

Higher sugar content of the grape berries (Brix degree value).

Better appearance and caliber of the products harvested: potato and vine

Increase in biomass in particular on hemp where the size of the stems was greater; also confirmed in the laboratory on rape, with an additional 14% of total biomass for the sample treated with a composition comprising the zeolite and calcareous marine algae relative to the control, whereas the increase in biomass obtained by using the zeolite alone was 2% and that obtained by using calcareous algae alone was 4%.

Shorter crop seasons, effect confirmed in the laboratory on rape and in the field on hemp. The effect observed was particularly advantageous on hemp, with early harvesting.

Reduction of the nitrogenous fertilization needs during a treatment with a biostimulant composition according to the invention: it was notably noted that a 50% reduction of the nitrogen supplies on wheat (spread over three supplies), combined with a treatment of three times 3 kg per hectare of biostimulant composition, gave rise to yields equivalent to the control without biostimulant and a 100% nitrogen supply.

Reduction of the fungal treatment needs, in particular a 20% to 50% reduction in the fungicidal treatment needs of the treated plots. This effect is due to a mechanical action of drying of the leaf surface, limiting the growth of fungal diseases.

The biostimulant does not cause any imbalance or any nuisance, whether on the environment, on the soil, on the water tables or on the living organisms, and, furthermore, it is natural and may be used in organic and conventional farming.

FIG. 1 shows, in a schematic and very simplified manner, the foliar application of a suspension 10 of the biostimulant composition according to the invention. Dosage examples were indicated above. The composition contains fine particles of zeolite 12 and of calcareous algae 14. Application of the suspension to the plants 18 is performed by means of a sprayer 16. The suspension wets the plant leaves. One portion of the particles enters the stomata of the plants. A second portion forms a thin film of zeolite and calcareous algae particles on the cuticle. The portion of the suspension which trickles into the soil 20 supplies nutrients thereto, which are useful for the growth of the plants. The calcareous algae contribute towards stabilizing the soil pH at the roots. The zeolite improves the CEC, the aeration in the vicinity of the roots, and does so in a long-lasting manner, since it is perennial in and not leachable into the soil.

Although particular embodiments have just been described in detail, a person skilled in the art will appreciate that various modifications and alternatives thereto can be developed in the light of the overall teaching provided by the present disclosure of the invention. Consequently, the specific arrangements and/or processes described herein are meant to be given purely as illustrations, without any intention of limiting the scope of the invention, which is determined by the scope of the attached claims.

The invention claimed is:

1. A biostimulant composition for plants comprising: micronized zeolite and micronized calcareous algae, the mass ratio between the zeolite content and the content of calcareous algae being between 0.1 and 10, the zeolite and the calcareous algae having, respectively, a particle size such that the diameter D90 is less than 20 μm, when the diameter D90 is measured by laser particle size analysis in accordance with the standard ISO 13320:2020 on the basis of the Fraunhofer scattering model, the zeolite and the calcareous algae together representing at least 60% by mass, of the solid matter of the composition.

2. The biostimulant composition as claimed in claim 1, in which the mass ratio between the zeolite content and the content of calcareous algae is between 0.25 and 4, in which the zeolite and the calcareous algae together represent at least 90% by mass of the solid matter of the composition and in which any possible solid component other than the zeolite and a calcareous algae is present in the composition in an individual mass content not exceeding 50% of the value that is the smaller between the mass content of calcareous algae and the mass content of zeolite.

3. The biostimulant composition as claimed in claim 2, in the form of a wettable powder.

4. The biostimulant composition as claimed in claim 2, in the form of a suspension concentrate.

5. The biostimulant composition as claimed in claim 2, in the form of water-dispersible granules.

6. The biostimulant composition as claimed in claim 1, in which the calcareous algae comprise lithothamnion.

7. The biostimulant composition as claimed in claim 6, in which lithothamnion represents at least 50% by mass of the calcareous algae.

8. The biostimulant composition as claimed in claim 1, in the form of a wettable powder.

9. The biostimulant composition as claimed in claim 1, in the form of a suspension concentrate.

10. The biostimulant composition as claimed in claim 1, in the form of water-dispersible granules.

11. The biostimulant composition as claimed in claim 1, in which the diameter D90 of the zeolite is less than 15 μm.

12. The biostimulant composition as claimed in claim 1, in which the diameter D90 of the calcareous algae is less than 15 μm.

13. The biostimulant composition as claimed in claim 1, comprising between 0.1% and 20% by mass, of bioassimilable trace elements selected from a group consisting of manganese, zinc, molybdenum, boron, iron, copper, sulfur, and bioassimilable oxides and salts of manganese, zinc, molybdenum, boron, iron, copper, or sulfur.

14. The biostimulant composition as claimed in claim 1, comprising micronized shell debris or other marine biogenic calcareous concretions.

15. The biostimulant composition as claimed in claim 1, in which the zeolite comprises at least 50% by mass, of chabazite and/or clinoptilolite.

16. An aqueous suspension comprising between 0.5% and 5% by mass, of a biostimulant composition for plants that comprises:

micronized zeolite and micronized calcareous algae, the mass ratio between the zeolite content and the content of calcareous algae being between 0.1 and 10, the zeolite and the calcareous algae having, respectively, a particle size such that the diameter D90 is less than 20 μm, when the diameter D90 is measured by laser particle size analysis in accordance with the standard ISO 13320:2020 on the basis of the Fraunhofer scattering model, the zeolite and the calcareous algae together representing at least 60% by mass of the solid matter of the composition.

17. A method for using a biostimulant composition, comprising the step of:
foliar application to plants of a biostimulant composition for plants, that comprises:
micronized zeolite and micronized calcareous algae, the mass ratio between the zeolite content and the content of calcareous algae being between 0.1 and 10, the zeolite and the calcareous algae having, respectively, a particle size such that the diameter D90 is less than 20 µm, when the diameter D90 is measured by laser particle size analysis in accordance with the standard ISO 13320:2020 on the basis of the Fraunhofer scattering model, the zeolite and the calcareous algae together representing at least 60% by mass of the solid matter of the composition.

18. The method as claimed in claim 17, in which the dosage of the biostimulant composition is such that it supplies, per hectare and per application, between 1 and 5 kg of solid matter of the biostimulant composition.

* * * * *